(12) United States Patent
Bruno et al.

(10) Patent No.: US 7,922,643 B2
(45) Date of Patent: Apr. 12, 2011

(54) METHOD FOR REDUCING THE EMISSION OF GREEN HOUSE GASES INTO THE ATMOSPHERE

(76) Inventors: Michael S. Bruno, Monrovia, CA (US); Roman Bilak, Calgary (CA); Leo Rothenburg, Waterloo (CA); Maurice B. Dusseault, White Rock (CA)

( * ) Notice: Subject to any disclaimer, the term of this patent is extended or adjusted under 35 U.S.C. 154(b) by 435 days.

(21) Appl. No.: 12/183,864

(22) Filed: Jul. 31, 2008

(65) Prior Publication Data

US 2009/0062593 A1 Mar. 5, 2009

Related U.S. Application Data

(63) Continuation-in-part of application No. PCT/US2007/086411, filed on Dec. 4, 2007.

(60) Provisional application No. 60/869,103, filed on Dec. 7, 2006.

(51) Int. Cl.
*A62D 3/00* (2007.01)
*B01D 53/62* (2006.01)
(52) U.S. Cl. ............ 588/250; 423/437.1; 423/220; 423/210; 423/245.1; 423/239.1; 423/242.1
(58) Field of Classification Search ............ 423/437.1, 423/220, 210, 245.1, 239.1, 242.1; 588/250
See application file for complete search history.

(56) References Cited

U.S. PATENT DOCUMENTS

| | | | |
|---|---|---|---|
| 5,261,490 A * | 11/1993 | Ebinuma | 166/266 |
| 5,454,666 A * | 10/1995 | Chaback et al. | 405/52 |
| 6,797,039 B2 * | 9/2004 | Spencer | 95/153 |
| 2001/0044566 A1 | 11/2001 | Bruno et al. | |
| 2003/0183390 A1 | 10/2003 | Veenstra et al. | |
| 2004/0200618 A1 | 10/2004 | Piekenbrock | |
| 2005/0027155 A1 * | 2/2005 | Pooler et al. | 588/250 |
| 2006/0249101 A1 | 11/2006 | Niass et al. | |

OTHER PUBLICATIONS

International Search Report dated Jul. 28, 2008, International Application No. PCT/US2007/086411.

* cited by examiner

*Primary Examiner* — Timothy C Vanoy
(74) *Attorney, Agent, or Firm* — Patterson & Sheridan, L.L.P.

(57) ABSTRACT

A method for reducing the emission of greenhouse gases, such as for example carbon dioxide, into the atmosphere above a ground surface, the method comprising injecting a gas stream comprising one or more than one greenhouse gas into a subsurface injection formation, where the subsurface injection formation comprises a water-laden layer comprising formation water, and where some or all of the greenhouse gases present in the gas stream become dissolved in the formation water in the subsurface injection formation, sequestering the one or more than one greenhouse gas in the subsurface injection formation, separating non-greenhouses gas in situ from the greenhouse gas, venting the non-greenhouse gas from the formation and thereby reducing the emission of greenhouse gases into the atmosphere.

34 Claims, 1 Drawing Sheet

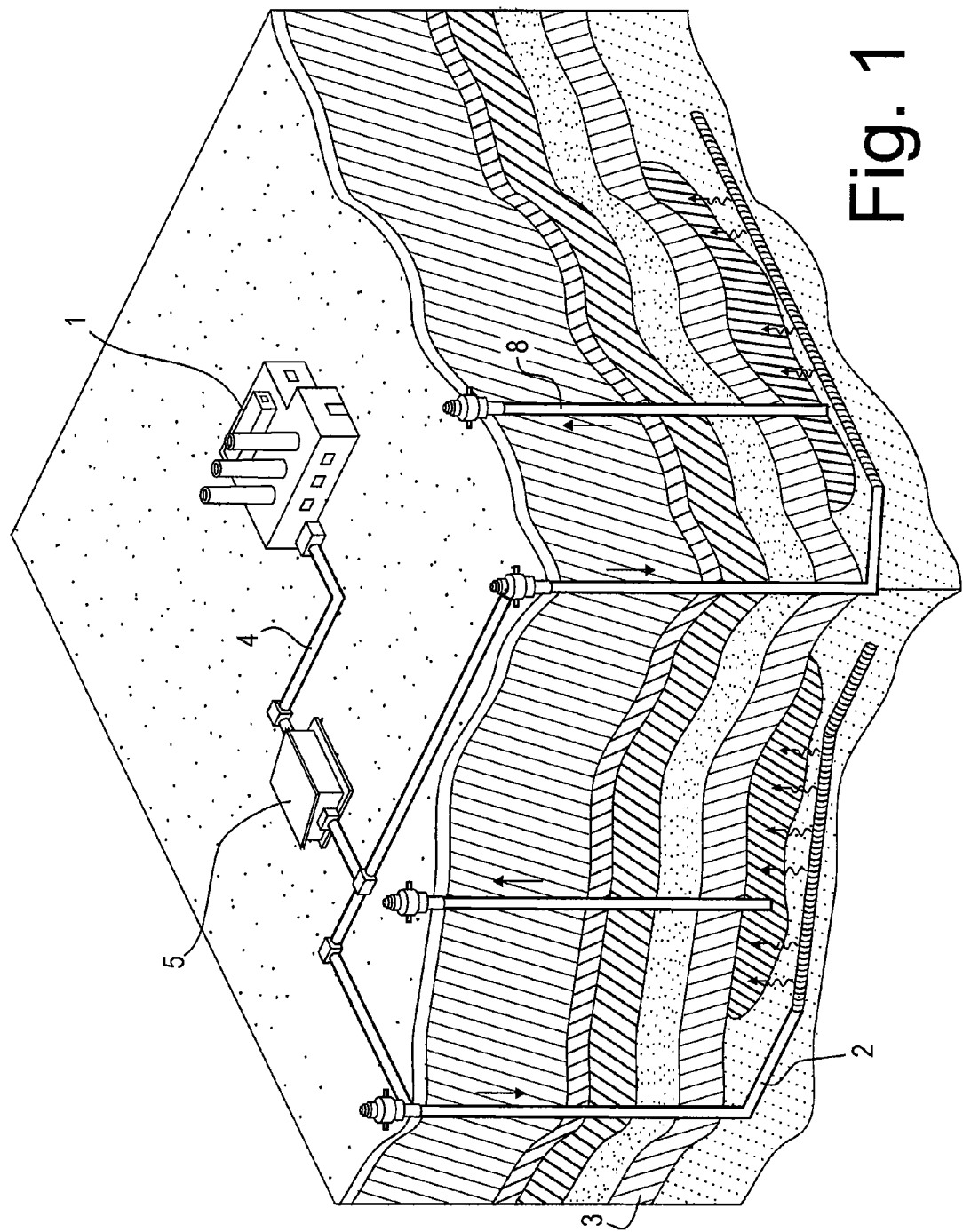

METHOD FOR REDUCING THE EMISSION OF GREEN HOUSE GASES INTO THE ATMOSPHERE

CROSS-REFERENCE TO RELATED APPLICATIONS

The present application is a Continuation-in-Part of PCT Application No. PCT/US2007/086411, filed on Dec. 4, 2007, which claims the benefit U.S. Provisional Patent Application No. 60/869,103, titled "Method for Reducing the Emission of Green House Gases into the Atmosphere," filed Dec. 7, 2006, the contents of both of which are incorporated in this disclosure by reference in their entirety.

BACKGROUND

In recent years, it has become evident that general climatic warming is occurring due to the "greenhouse effect" caused by the increasing presence of certain greenhouse gases (GHGs) generated from human activities. Among the gaseous components in the atmosphere that contribute to the greenhouse effect are carbon dioxide, methane, nitrous oxide and ozone. By contrast, oxygen, nitrogen and sulfur dioxide do not appear to contribute to the greenhouse effect.

In order to mitigate the effects of increasing greenhouse gases generated from human activities, a variety of proposals have been made to reduce the emission of greenhouse gases into the atmosphere.

There is still a need for a new method for reducing the emission of greenhouse gases into the atmosphere.

SUMMARY

According to one embodiment of the present invention, there is provided a method for reducing the emission of greenhouse gases into the atmosphere by the in-situ separation of a greenhouse gas from a non-greenhouse gas within a deep subsurface formation and sequestering the greenhouse gas within the formation. According to one aspect, the method comprises, a) selecting a gas stream from a stationary source of production, the gas stream comprising a mixture of at least one greenhouse gas and at least one non-greenhouse gas, said greenhouse gas being sequesterable within a deep subsurface aquifer and said non-greenhouse gas being substantially non-sequesterable within the formation when introduced under the same conditions as the greenhouse gas; b) selecting a subsurface injection formation comprising a deep water-laden layer overlain by one or more layers, said water-laden layer being capable of sequestering at least a portion of the greenhouse gas while being incapable of sequestering the non-greenhouse gas when introduced under the same conditions as the greenhouse gas, thereby being capable of effectively separating the non-greenhouse gas from the greenhouse gas; c) pressurizing the gas stream; d) delivering the pressurized gas stream into an injection well having an inlet communicating with said gas stream and an outlet in communication with said water-laden layer, thereby injecting the gas stream under pressure into the water-laden layer of the subsurface injection formation; e) allowing the gases in the gas stream to remain in the subsurface injection formation until at least some or all of the greenhouse gases are sequestered within the water-laden layer and the non-greenhouse gas is separated from the greenhouse gas; and f) venting the separated non-greenhouse gas from the water-laden layer. The conditions within the water-laden layer, and the nature of the greenhouse and non-greenhouse gasses present in the waste stream, permit sequestration of the greenhouse gasses and non-sequestration, or separation, of the non-greenhouse gas.

Preferably, the water-laden layer consists of a deep saline aquifer. Preferably, at least one of the overlying layers is substantially impervious to gas and water.

The separated non-greenhouse gas is permitted to rise within the formation, until blocked by the overlying impermeable layer where it accumulates as a gas cap. The non-greenhouse gas is vented to the ground surface, preferably via a well that reaches into the subsurface region where the non-greenhouse gas accumulates.

In another embodiment, the one or more than one type of greenhouse gas is selected from the group consisting of carbon dioxide, hexafluoro-ethane, methane, nitrous oxide, sulfur hexafluoride, tetrafluoromethane (carbon tetrafluoride), trifluoromethane, 1,1,1,2-tetrafluoroethane, and 1,1-difluoro-ethane. In another embodiment, the source of production is from a human industrial activity. In one embodiment, human industrial activity is selected from the group consisting of an ethylene production plant, a fertilizer production plant, a methanol production plant, a mining operation, a natural gas production operation, a natural gas treatment plant, a petroleum production operation and a petroleum refining operation.

In one embodiment, the source is a thermal power plant and the gas consists of raw flue gas from the combustion process. In another embodiment, the water-laden layer of the subsurface injection formation has a salinity of at least 10,000 ppm (10 gm/liter). In another embodiment, the subsurface injection formation has a pH of between 4 and 10. In another embodiment, the subsurface injection formation is at least 100 meters below the ground surface. In another embodiment, the subsurface injection formation is between 100 meters and 1000 meters below the ground surface. In another embodiment, the subsurface injection formation is at least 500 meters below the ground surface. In another embodiment, the subsurface injection formation is between 500 meters and 1000 meters below the ground surface.

In one embodiment, the method further comprises performing a geochemical analysis of the formation water in the water-laden layer of the subsurface injection formation to verify that the subsurface injection formation comprises only ancient water, and that the formation water is not in communication with shallower, newer water sources. In another embodiment, the gas stream is injected within a distance from the source of production selected from the group consisting of 5 kilometers, 10 kilometers, 50 kilometers and 100 kilometers. In another embodiment, injecting of the gas stream comprises transporting the gas stream from the source of production to an injection pump at the surface site of injection of the gas stream above the subsurface injection formation. In another embodiment, injecting the gas stream comprises a) providing one or more than one device selected from the group consisting of a compressor, a condenser, a pipeline, a pump and a valve to process and b) transporting the greenhouse gases from the source of production to the surface site of injection of the gas stream above the subsurface injection formation. In another embodiment, the method further comprises modifying one or more than one attribute of the gas stream prior to or during injection, where the one or more than one attribute is chosen from one or both of pressure or temperature to promote dissolution of the one or more than one greenhouse gas present in the gas stream into the water-laden layer of the subsurface injection formation. In another embodiment, the pH and/or salinity within the subsurface may be altered to enhance the sequestration and/or separation process. As will be apparent from the nature of such attributes, the treatment may either modify the one or more of the above attributes of the gas stream itself, or the subsurface environment which contains the sequestered greenhouse gas. In another embodiment, injecting the gas stream comprises transporting the gas stream from the source of production to the surface site of injection of the gas stream above the subsurface injection formation, and the method further comprises compressing the gas stream during transporting the gas stream. In another embodiment, the water-laden layer of the subsurface injection formation comprises a pore pressure and further comprises a fracture pressure, and the method further comprises compressing the gas stream to a pressure value greater than the pore pressure of the subsurface injection formation but less than the fracture pressure of the subsurface injection formation.

In one embodiment, the method further comprises adding one or more than one chemical additive to the gas stream to promote dissolution of the one or more than one greenhouse gas present in the gas stream into the water-laden layer of the subsurface injection formation. In another embodiment, the method further comprises inducing hydraulic fractures into the subsurface injection formation before injecting the gas stream. In another embodiment, the gas stream is the waste stream from a thermal power plant, the thermal power plant comprises a combustion gases stack, and injecting the gas stream comprises diverting greenhouse gases present in a waste stream of the thermal power plant from the combustion gases stack of the thermal power plant to the injection site above the subsurface injection formation.

In one embodiment, the percent of greenhouse gases in the gas stream from a source of production is 25% or more than 25%. In another embodiment, the percent of greenhouse gases in the gas stream from a source of production is 50% or more than 50%. In another embodiment, the percent of greenhouse gases in the gas stream from a source of production is 95% or more than 95%. In another embodiment, the gas stream consists of greenhouse gases. In another embodiment, the gas stream comprises both greenhouse gases and non-greenhouse gases.

In one embodiment, injecting the gas stream comprises installing an injection well into the subsurface injection formation from the surface site of injection above the subsurface injection formation. In another embodiment, the injection well is a type of well selected from the group consisting of a vertical well, a deviated well and a horizontal well. In another embodiment, the method further comprises performing one or more than one of geological data analyses, geomechanical data analyses, and numerical simulation techniques to determine the optimum injection-disposal well pattern, well spacing, and well configuration to optimize the dissolution of the greenhouse gases in the water-laden layer.

In another embodiment, the gas stream comprises nitrogen, the subsurface injection formation comprises a surface side (top) toward the ground surface, the method further comprises, during or after, sequestering the greenhouse gases in the water-laden layer, allowing the nitrogen to rise toward the surface side (top) of the subsurface injection formation or between the sub-surface injection formation and the ground surface until some or all of the nitrogen reaches a layer that is relatively impermeable to water, and the method further comprises venting the nitrogen into atmospheric gases above the ground surface. In another embodiment, injecting the gas stream comprises installing an injection well into the subsurface injection formation from the surface site of injection above the subsurface injection formation, where the injection well is a first well, and where venting comprises providing one of more second wells from the ground surface into the subsurface injection formation. The second well or wells may comprise any combination of vertical, horizontal or deviated wells. In another embodiment, the method further comprises providing the second well with one or more than one of casing perforations, downhole or surface based water-gas separation systems, and downhole or surface pumps.

In another embodiment, injecting the gas stream comprises injecting the gas stream from the source of production continually as the gas stream is produced by the source of production. In another embodiment, injecting the gas stream comprises injecting the gas stream from the source of production continually over a time selected from the group consisting of at least one day, at least one week, at least one month, at least one year, at least five years and at least ten years. In another embodiment, injecting the gas stream comprises injecting the gas stream from the source of production intermittently as the gas stream is produced by the source of production.

BRIEF DESCRIPTION OF THE DRAWING

FIG. 1 is a schematic view of an embodiment of the present invention.

DESCRIPTION

According to one embodiment of the present invention, there is provided a method for reducing the emission of greenhouse gases, such as for example carbon dioxide, into the atmosphere above a ground surface. The method comprises injecting a gas stream comprising one or more than one greenhouse gas into a subsurface injection formation. The gas stream further comprises at least one non-greenhouse gas. The subsurface injection formation comprises a water-laden layer comprising formation water, and some or all of the greenhouse gases present in the gas stream become dissolved in the formation water in the subsurface injection formation sequestering the one or more than one greenhouse gas in the subsurface injection formation. The non-greenhouse gas separates in situ within the formation. After separating from the greenhouse gas, the non-greenhouse gas accumulates in a subsurface location from where it may be vented to the surface by any convenient means. The method thereby reduces the emission of greenhouse gases into the atmosphere. In a preferred embodiment, the method comprises injecting the gas stream near the source of production.

Preferably, the gas stream consists of a raw gas stream from an industrial source such as a fossil fuel-burning thermal power plant. The raw gas stream contains $CO_2$ and may also contain other greenhouse gases, as well as nitrogen and other non-greenhouse gasses. Typical flue gas effluent from a thermal power plant such as coal-fired plant contains approximately 10-15% $CO_2$. This flue gas stream may be introduced directly into the subsurface formation in accordance with the present method, as described in more detail herein.

Stationary sources of greenhouse gasses such as fossil fuel-burning thermal power plants, industrial plants, and resource processing facilities (as well as other such sources) present an environmental challenge due to the volumes of greenhouse gasses produced. However, they also present an opportunity to mitigate their harm, in that their stationary nature and in some cases, the ability to site the plant at a variety of locations, permits a variety of approaches to reduction of greenhouse gas emissions.

One approach for stationary sources is to sequester greenhouse gas generated by the source within deep subsurface formations. Typically, concentrated gas such as $CO_2$ is injected under pressure into a subsurface formation. $CO_2$ can be sequestered within a deep saline aquifer or elsewhere, in a variety of physical forms. Once sequestered within a suitably deep formation, greenhouse gasses are expected to reside in the formation for an extremely long time, thereby effectively removing them from the atmosphere. In general, deep subsurface sequestration is seen as a promising solution to the greenhouse gas problem. However, conventional methods are costly in that they require the greenhouse gasses to be separated from the raw gas waste stream prior to subsurface injection.

Deep saline aquifers exist in many locations and represent an attractive location to sequester $CO_2$ and other greenhouse gasses. These aquifers are also capable of sequestering certain non-greenhouse gasses such as sulfur dioxide that constitute significant environmental pollutants. Due to their depth, sequestration within suitably selected saline aquifers of this type is usually considered substantially permanent. In these environments (and potentially others), greenhouse gas such as $CO_2$ as well as some non-greenhouse pollutants such as sulfur dioxide can be differentially sequestered such that the non-polluting non-greenhouse gasses such as nitrogen are either not sequestered or only minimally sequestered. For example, in aqueous environments, in particular saline solutions, $CO_2$ readily dissolves into solution (as does sulfur dioxide), while nitrogen is only minimally soluble. In these environments, a mixture of gasses which contains greenhouse and non-greenhouse gasses may separate, with at least some of the greenhouse gasses being sequestered within the formation (along with sulfur dioxide), while the non-greenhouse gas separates out.

The method will now be disclosed in detail.

As used in this disclosure, the terms "greenhouse gas" and "greenhouse gases" are defined as one or more than one gas selected from the group consisting of carbon dioxide, hexafluoroethane, methane, nitrous oxide, sulfur hexafluoride, tetrafluoromethane (carbon tetrafluoride), trifluoromethane 1,1,1,2-tetrafluoroethane, and 1,1-difluoroethane. Greenhouse gas should also be understood to include other gases that are identified in the future as contributing to the greenhouse effect.

As used in this disclosure, except where the context requires otherwise, the term "comprise" and variations of the term, such as "comprising," "comprises" and "comprised" are not intended to exclude other additives, components, integers or steps.

As used in this disclosure, except where the context requires otherwise, the method steps disclosed and shown are not intended to be limiting nor are they intended to indicate that each step is essential to the method or that each step must occur in the order disclosed.

As used in this disclosure, the term "near the source of production" is defined as within 100 kilometers of the source of production.

As used in this disclosure, the phrase "relatively impermeable to water" means having a permeability to water of less than 10 millidarcy.

As used in this disclosure, the phrase "relatively low permeability to water" means having a permeability to water of between 10 millidarcy and 100 millidarcy.

As used in this disclosure, the phrase "relatively high permeability to water" means having a permeability to water of greater than 100 millidarcy.

As used in this disclosure, the phrase "high porosity" means having a rock formation with an intergranular void space of at least 20% of the total rock formation volume.

According to one embodiment of the present invention, there is provided a method for reducing the emission of greenhouse gases into the atmosphere. First, the method comprises selecting a gas stream from a source of production, the gas stream comprising one or more than one type of greenhouse gas selected from the group consisting of carbon dioxide, hexafluoro-ethane, methane, nitrous oxide, sulfur hexafluoride, tetrafluoromethane (carbon tetrafluoride), trifluoromethane, 1,1,1,2-tetrafluoroethane, and 1,1-difluoroethane. In one embodiment, the source is from a human industrial activity. In a preferred embodiment, the human industrial activity is selected from the group consisting of an ethylene production plant, a fertilizer production plant, a methanol production plant, a mining operation, a natural gas production operation, a natural gas treatment plant, a petroleum production operation and a petroleum refining operation, such as for example heavy oil and bitumen upgraders. In another preferred embodiment, the source of production is a thermal power plant, where coal, oil or natural gas are burned to generate steam for electricity generation, where the greenhouse gas is from the gaseous waste stream (also known as "flue gas") generated during the thermal process and coming from the combustion gases stack. The source can, however, be from any suitable facility, as will be understood by those with skill in the art with reference to this disclosure.

Next, the method comprises selecting a subsurface injection formation below the ground surface for sequestering the one or more than one greenhouse gas in the gas stream from the source and for separating the greenhouse gas from the non-greenhouse gas present within the gas stream. In one embodiment, a subsurface injection formation comprises a water-laden layer comprising formation water separated from the ground surface above the sub-surface injection formation by one or more than one layer that is relatively impermeable to water (less than 10 millidarcy). For example, in one embodiment, the subsurface injection formation comprises formation water having a high porosity, such as a water-laden layer of a water-saturated sand formation, where the formation water is below a layer comprising shale or comprising other rock types containing clay minerals, or comprising both shale and comprising other rock types containing clay minerals. Another suitable subsurface injection formation is sufficiently deep to ensure that the injected gas will be sequestered and not pose a potential threat to the environment or to water supplies, even without thick and clearly defined layers of relatively high permeability to water layers alternating with relatively low permeability to water/relatively impermeable to water layers. As will be understood by those with skill in the art with reference to this disclosure, a sufficient depth is related to the dissolution rate of the carbon dioxide as compared to the rate of rise due to buoyancy. Once the carbon dioxide is fully absorbed in the water, the carbon dioxide-water mixture is more dense than pure water and will no longer tend to rise to the ground surface.

As will be understood by those with skill in the art with reference to this disclosure, the higher the pressure of the water-laden layer and the lower the temperature of the water-laden layer, the greater the solubility of the greenhouse gas such as carbon dioxide being sequestered in the water-laden layer. In one embodiment, the water-laden layer of the subsurface injection formation has an average (median) temperature of between 20 C and 200 C. In another embodiment, the water-laden layer of the subsurface injection formation has an average (median) pressure gradient (pressure per unit of depth, i.e., kilopascals per meter) of between 8 kilopascals (kPa)/meter of depth and 12 kilopascals/meter of depth.

In one embodiment, the water-laden layer of the subsurface injection formation has a salinity of at least 10,000 ppm (10 gm/liter), and is therefore unsuitable for human consumption or for industrial use other than the method for reducing the emission of greenhouse gases into the atmosphere disclosed in this disclosure. In another embodiment, the water-laden layer of the subsurface injection formation has a pH of between 4 and 10 to facilitate solubility of the greenhouse gas in the water-laden layer. In a particularly preferred embodiment, the subsurface injection formation is deeper than any groundwater which can be removed for human use. In another preferred embodiment, the subsurface injection formation is separated from any zone of potable groundwater or groundwater suitable for an industrial use nearer the ground surface by at least one layer with relatively high permeability to water adjacent at least one layer with relatively low permeability (or relatively impermeable) to water.

In another preferred embodiment, the subsurface injection formation is at least 100 meters below the ground surface. The 100 meter depth is sufficiently deep to insure that the injected greenhouse gas will be sequestered, even without at least one layer with relatively high permeability to water adjacent at least one layer with relatively low permeability (or relatively impermeable) to water, and sufficiently deep to ensure that the injected gas will not pose a potential threat to the environment or to water supplies. In a preferred embodiment, the subsurface injection formation is between 100 meters and 1000 meters below the ground surface, which is a range of depths near enough to the surface to allow injection of the gas in a cost-effective manner. In a particularly preferred embodiment, the subsurface injection formation is at least 500 meters below the ground surface. In another particularly preferred embodiment, the subsurface injection formation is between 500 meters and 1000 meters below the ground surface.

In one embodiment, the method comprises selecting a surface site of injection of the gas stream above the subsurface injection formation for accessing the subsurface injection formation. In a preferred embodiment, the surface site of injection of the gas stream, as well as the subsurface injection formation, is selected to additionally protect ground and ocean waters, such as for example by selecting a subsurface injection formation that does not outcrop or interact with formations between the subsurface injection formation and the ground surface. In one embodiment, the method further comprises performing a geochemical analysis of the formation water in the water-laden layer of the sub-surface injection formation to verify that the subsurface injection formation comprises only ancient water, and that the formation water is not in communication with non-ancient water sources. The term "ancient water" is well understood by those with skill in this art, and means water deposited within the ground at least one million years ago and not rechargeable from the surface by rain water percolating through the ground, whereas "non-ancient water" means water that was deposited within the ground less than one million of years ago and that is rechargeable from the surface.

Then, the method comprises injecting the gas stream comprising the one or more than one greenhouse gas from the source from the surface site of injection above the subsurface injection formation into the water-laden layer of the subsurface injection formation. In one embodiment, the gas stream is injected near the source of production. In one embodiment, the gas stream is injected within 100 kilometers of the source of production. In another embodiment, the gas stream is injected within 50 kilometers of the source of production. In another embodiment, the gas stream is injected within 10 kilometers of the source of production. In another embodiment, the gas stream is injected within 5 kilometers of the source of production.

In one embodiment, injecting of the gas stream comprises transporting the gas stream from the source of production to an injection pump at the surface site of injection of the gas stream above the subsurface injection formation. In one embodiment, transporting the gas stream comprises providing one or more than one device selected from the group consisting of a compressor, a condenser, a pipeline, a pump and a valve to process and to move the greenhouse gases from the source of production to the surface site of injection of the gas stream above the subsurface injection formation.

In one embodiment, the method further comprises modifying one or more than one attribute of the gas stream prior to or during injection, where the one or more than one attribute is selected from the group consisting of pressure and temperature to promote dissolution of the one or more than one greenhouse gas present in the gas stream into the water-laden layer of the subsurface injection formation. The conditions within the formation may also be altered, for example the pH and/or salinity of the aquifer. For example, in one embodiment, the pressure of the injected gas stream is modified to come closer to or match the pressure of the water-laden layer of the subsurface injection formation. In another embodiment, the temperature of the injected gas stream is modified to come closer to or match the temperature of the water-laden layer of the sub-surface injection formation. In another embodiment, the pH of the injected gas stream is modified to come closer to or match the pH of the water-laden layer of the subsurface injection formation. In another embodiment, the salinity of the injected gas stream is modified to come closer to or match the salinity of the water-laden layer of the sub-surface injection formation. In one embodiment, modifying one or more than one attribute of the gas stream comprises providing a heat exchanger to decrease the temperature of the gas stream prior to injection during transporting the gas stream. In one embodiment, modifying one or more than one attribute of the gas stream comprises compressing the gas stream during transporting the gas stream. In one embodiment, modifying one or more than one attribute comprises adding one or more than one chemical additive to the gas stream.

In a preferred embodiment, the water-laden layer of the subsurface injection formation comprises a pore pressure (the pressure of water in the pore spaces of the subsurface injection formation) and further comprises a fracture pressure (the pressure of injected substance into the subsurface injection formation that is required to surpass the strength of the sub-surface injection formation rock and thereby creates fractures/cracks in the subsurface injection formation), and the method comprises compressing the gas stream to a pressure value greater than the pore pressure of the subsurface injection formation (to facilitate injection) but less than the fracture pressure of the subsurface injection formation (to avoid fracturing the subsurface injection formation and risk loss of sequestration of the gas). For example, where the pore pressure of a subsurface injection formation at 500 meter depth is 5 MPa, and where the fracture pressure of the subsurface injection formation at 500 meter depth is 10 MPa, the gas stream would be compressed to a pressure of at least 5 MPa but less than 10 MPa to be injected into the subsurface injection formation.

In another embodiment, the method further comprises inducing hydraulic fractures into the subsurface injection formation before injecting the gas stream. Inducing hydraulic fractures into the subsurface injection formation increases the surface area of contact with the formation water in the water-laden layer thereby promoting dissolution of the one or more than one greenhouse gas in the gas stream into the water-laden layer of the subsurface injection formation. Further, inducing hydraulic fractures into the subsurface injection formation decreases resistance within the subsurface injection formation to injection of the gas stream.

In another embodiment, the gas stream is the waste stream from a thermal power plant, where the thermal power plant comprises a combustion gases stack, and where injecting the gas stream comprises diverting greenhouse gases present in a waste stream of the thermal power plant from the combustion gases stack of the thermal power plant to the injection site above the subsurface injection formation.

In one embodiment, the percent of greenhouse gases in the gas stream from a source of production, such as the waste gas stream in the combustion gases stack of a thermal power plant, is 25% or more than 25%. In another embodiment, the percent of greenhouse gases in the gas stream from a source of production, such as the waste gas stream in the combustion gases stack of a thermal power plant, is 50% or more than 50%. In another embodiment, the percent of greenhouse gases in the gas stream from a source of production, such as the waste gas stream in the combustion gases stack of a thermal power plant, is 95% or more than 95%. In another preferred embodiment, the gas stream, such as the waste gas stream in the combustion gases stack of a thermal power plant, consists of greenhouse gases.

In another embodiment, injecting the gas stream comprises installing an injection well into the subsurface injection formation from the surface site of injection above the subsurface injection formation. In one embodiment, the injection well is a type of well selected from the group consisting of a vertical well, a deviated well and a horizontal well. In a preferred embodiment, the well is a horizontal well.

In one embodiment, the method further comprises performing one or more than one of geological data analyses, geomechanical data analyses, and numerical simulation techniques to determine the optimum injection-disposal well pattern, well spacing, and well configuration to optimize the dissolution of the greenhouse gases in the water-laden layer.

Next, the method further comprises allowing the greenhouse gases in the gas stream (and non-greenhouse gases when present) to remain in the subsurface injection formation until at least some or all of the greenhouse gases either, i) dissolve into the formation water in the water-laden layer of the sub-surface injection formation, ii) displace formation water in the water-laden layer of the subsurface injection formation, or both iii) dissolve into the formation water in the water-laden layer of the subsurface injection formation and displace formation water in the water-laden layer of the subsurface injection formation, thereby sequestering some or all of the greenhouse gases in the subsurface injection formation.

In one embodiment, injecting the gas stream comprises injecting the gas stream from the source of production continually as the gas stream is produced by the source of production, such as for example injecting the gas stream continually over a time selected from the group consisting of at least one day, at least one week, at least one month, at least one year, at least five years and at least ten years. In another embodiment, the method comprises injecting the gas stream from the source of production intermittently as the gas stream is produced by the source of production, such as for example injecting the gas stream for 8 hours per day, six days of each week.

Example I

FIG. 1 illustrates the method described in Example 1. By way of example only, a reduction of emission of greenhouse gases into the atmosphere above a ground surface is accomplished as follows. First, a gas stream is selected as the waste gas stream (flue gas) generated by a thermal power plant 1. As an example, a 1000 megawatts coal-fired thermal power plant typically generates about 3.4 million m³ flue gas/hr, where the flue gas comprises about 12% carbon dioxide, thereby generating about 410,000 m³ carbon dioxide/hr of carbon dioxide, or about 10,000,000 m³ carbon dioxide/day.

Next, a subsurface injection formation 2 suitable for sequestering the one or more than one greenhouse gas in the waste gas stream is selected, where the subsurface injection formation is at least 900 meters below the surface site of injection above the subsurface injection formation, and where the subsurface injection formation comprises a water-laden sand layer of relatively high permeability to water below a layer of shale 3 that is relatively impermeable to water. In this example, the subsurface injection formation comprises a water-laden sand layer of about 20 km wide by 20 km long by 100 meters thick with an average porosity of 25%.

Then, the waste gas stream consisting for raw flue gas is removed from the combustion gases stack of the thermal power plant 1 and transported by pipeline 4 to the surface site of injection above the subsurface injection formation.

Next, the waste gas stream is pressurized at 5 and injected into the subsurface injection formation at a pressure of about $1\times10^4$ kPa. Carbon dioxide has a solubility in water of about 27 cubic meters (m³) of carbon dioxide per cubic meter water at about $1\times10^4$ kPa and 55 C. Therefore, the storage capacity of the subsurface injection formation is about 10 billion cubic meters of water with a carbon dioxide storage capacity of about 267 billion cubic meters. Assuming the waste gas stream is 12% carbon dioxide and 88% nitrogen, and that the nitrogen is vented back to the atmosphere, the carbon dioxide storage capacity of the subsurface injection formation is about 73 years worth of carbon dioxide production (267 billion m³ divided by 10 million m³/day divided by 365 days per year).

Finally, the greenhouse gases in the waste gas stream are allowed to remain in the subsurface injection formation until at least some or all of the greenhouse gases either, i) dissolve into the water in the water-laden layer of the subsurface injection formation, ii) displace water in the water-laden layer of the subsurface injection formation, or both iii) dissolve into the water in the water-laden layer of the subsurface injection formation and displace water in the water-laden layer of the subsurface injection formation, thereby sequestering some or all of the greenhouse gases in the subsurface injection formation.

In one embodiment, the gas stream comprises nitrogen, a non-greenhouse gas. In a preferred embodiment, the gas stream comprises nitrogen, the subsurface injection formation comprises a surface side (top) toward the ground surface and the method further comprises, during or after, sequestering the greenhouse gases in the water-laden layer, allowing the nitrogen to rise toward the surface side (the top) of the subsurface injection formation or between the subsurface injection formation and the ground surface until some or all of the nitrogen 6 reaches a layer that is relatively impermeable to water, and the method further comprises venting the nitrogen into atmospheric gases above the ground surface. In one embodiment, injecting the gas stream comprises installing an injection well 7 into the subsurface injection formation from the surface site of injection above the subsurface injection formation, the injection well is a first well 7, and venting comprises providing a second well 8 from the ground surface into the subsurface injection formation. In one embodiment, the first and second wells 7 and 8 are the same or different and selected from the group consisting of a vertical well, a deviated well and a horizontal well. In a preferred embodiment, the method further comprises providing the second well with one or more than one of casing perforations, downhole or surface based water-gas separation systems, and downhole or surface pumps, as will be understood by those with skill in the art with reference to this disclosure.

Although the present invention has been discussed in considerable detail with reference to certain preferred embodiments, other embodiments are possible. Therefore, the scope of the appended claims should not be limited to the description of preferred embodiments contained in this disclosure. All references cited herein are incorporated by reference in their entirety.

What is claimed is:

1. An in-situ method for separating a greenhouse gas from a non-greenhouse gas and sequestering the greenhouse gas, comprising:
    a) selecting a gas stream from a stationary source of production, said gas stream comprising a mixture of greenhouse and non-greenhouse gas;
    b) selecting a subsurface formation comprising a deep water-laden layer overlain by at least one overlying layer, said water-laden layer being capable of sequestering at least a portion of the greenhouse gas while being substantially incapable of sequestering the non-greenhouse gas under the same injection conditions, thereby being capable of separating the non-greenhouse gas from the greenhouse gas;
    c) pressurizing said gas stream;
    d) delivering said pressurized gas stream into an injection well having an inlet communicating with said gas stream and an outlet within said water-laden layer, thereby introducing said gas stream under pressure into said water-laden layer;
    e) sequestering at least a portion of said greenhouse gas and separating at least a portion of said non-greenhouse gas from said greenhouse gas within said water-laden layer; and
    f) venting said separated non-greenhouse gas from said water-laden layer.

2. A method as defined in claim 1 wherein said stationary source of production comprises an industrial activity.

3. A method as defined in claim 1 wherein said greenhouse gas comprises $CO_2$.

4. A method as defined in claim 1 wherein said non-greenhouse gas comprises nitrogen.

5. A method as defined in claim 1 wherein said water-laden layer comprises a deep saline aquifer.

6. A method as defined in claim 1 wherein said overlying layer is substantially impervious to water.

7. A method as defined in claim 1 wherein said step of venting said non-greenhouse gasses comprises removing said non-greenhouses gasses through a well which has an inlet within said water-laden layer that is above the outlet of said injection well, and an outlet for discharging said non-greenhouse gasses.

8. A method as defined in claim 1 wherein said step of separating said greenhouse and non-greenhouse gasses comprises permitting said gas stream to remain within said water-laden layer for sufficient time to permit said greenhouse gas to sequester and said non-greenhouse gas to separate from said greenhouse gas.

9. A method as defined in claim 1 wherein said non-greenhouse gas is permitted to accumulate within said water laden layer at a location immediately beneath said overlying layer, and said step of venting comprises accessing said accumulated gas to permit release of said non-greenhouse gas from said water-laden layer.

10. A method for reducing the emission of greenhouse gases into the atmosphere above a ground surface, the method comprising:
    a) selecting a gas stream from a source of production, the gas stream comprising one or more than one type of greenhouse gas and nitrogen;
    b) selecting a subsurface injection formation below the ground surface for sequestering the one or more than one greenhouse gas in the gas stream from the source of production, the subsurface injection formation comprising a water-laden layer comprising formation water;
    c) selecting a surface site of injection of the gas stream above the subsurface injection formation for accessing the subsurface injection formation;
    d) injecting the gas stream comprising the one or more than one greenhouse gas from the source of production from the surface site of injection into the formation water of the water-laden layer of the subsurface injection formation;
    e) allowing the greenhouse gases in the gas stream to remain in the subsurface injection formation until at least some or all of the greenhouse gases either, i) dissolve into the formation water in the water-laden layer of the sub-surface injection formation, ii) displace formation water in the water-laden layer of the subsurface injection formation, or both iii) dissolve into the formation water in the water-laden layer of the subsurface injection formation and displace formation water in the water-laden layer of the subsurface injection formation, thereby sequestering some or all of the greenhouse gases in the subsurface injection formation; and
    f) allowing the nitrogen to rise to the top of the formation.

11. The method of claim 10, where the subsurface injection formation is separated from the ground surface above the subsurface injection formation by one or more than one layer that is relatively impermeable to water.

12. The method of claim 10, where the one or more than one type of greenhouse gas is selected from the group consisting of carbon dioxide, hexafluoro-ethane, methane, nitrous oxide, sulfur hexafluoride, tetrafluoromethane (carbon tetrafluoride), trifluoromethane, 1,1,1,2-tetrafluoroethane, and 1,1-difluoro-ethane.

13. The method of claim 10, where the source of production comprises a raw waste stream from a source selected from the group consisting of an ethylene production plant, a fertilizer production plant, a methanol production plant, a mining operation, a natural gas production operation, a natural gas treatment plant, a petroleum production operation, a petroleum refining operation, and a thermal power plant.

14. The method of claim 10, where the water-laden layer of the subsurface injection formation has a salinity of at least 10,000 ppm (10 gm/liter).

15. The method of claim 10, where the subsurface injection formation has a pH of between 4 and 10.

16. The method of claim 10, where the subsurface injection formation is at least 500 meters below the ground surface.

17. The method of claim 10, further comprising performing a geochemical analysis of the formation water in the water-laden layer of the subsurface injection formation to verify that the subsurface injection formation comprises only ancient water, and that the formation water is not in communication with shallower newer water sources.

18. The method of claim 10, where injecting of the gas stream comprises transporting the gas stream from the source of production to an injection pump at the surface site of injection of the gas stream above the subsurface injection formation.

19. The method of claim 10 where the method further comprises modifying one or more than one attribute of the gas stream prior to or during injection, where the one or more than one attribute is selected from the group consisting of pressure and temperature to promote dissolution of the one or more than one greenhouse gas present in the gas stream into the water-laden layer of the subsurface injection formation.

20. The method of claim 10, where the method further comprises providing a heat exchanger to decrease the temperature of the gas stream.

21. The method of claim 10, where the water-laden layer of the subsurface injection formation comprises a pore pressure and further comprises a fracture pressure, and where the method comprises compressing the gas stream prior to injection into the subsurface injection formation to a pressure value greater than the pore pressure of the subsurface injection formation but less than the fracture pressure of the subsurface injection formation.

22. The method of claim 10, further comprising adding one or more than one chemical additive to the gas stream to promote dissolution of the one or more than one greenhouse gas present in the gas stream into the water-laden layer of the subsurface injection formation.

23. The method of claim 10, further comprising inducing hydraulic fractures into the subsurface injection formation before injecting the gas stream.

24. The method of claim 10, where the percent of greenhouse gases in the gas stream from a source of production is 25% or more than 25%.

25. The method of claim 10, where the percent of greenhouse gases in the gas stream from a source of production is 50% or more than 50%.

26. The method of claim 10, where the gas stream comprises both greenhouse gases and non-greenhouse gases.

27. The method of claim 10, where injecting the gas stream comprises installing an injection well into the subsurface injection formation from the surface site of injection above the subsurface injection formation.

28. The method of claim 27, where the injection well is a type of well selected from the group consisting of a vertical well, a deviated well and a horizontal well.

29. The method of claim 10, further comprising performing one or more than one of geological data analyses, geomechanical data analyses, and numerical simulation techniques to determine the optimum injection-disposal well pattern, well spacing, and well configuration to optimize the dissolution of the greenhouse gases in the water-laden layer.

30. The method of claim 10, where the gas stream comprises nitrogen;
where the subsurface injection formation comprises a surface side (top) toward the ground surface;
where the method further comprises, during or after, sequestering the greenhouse gases in the water-laden layer, allowing nitrogen to rise toward the surface side (top) of the subsurface injection formation or between the sub-surface injection formation and the ground surface until some or all of the nitrogen reaches a layer that is relatively impermeable to water; and
where the method further comprises venting the nitrogen into atmospheric gases above the ground surface.

31. The method of claim 30, where injecting the gas stream comprises installing an injection well into the subsurface injection formation from the surface site of injection above the subsurface injection formation;
where the injection well is a first well; and
where venting comprises providing a second well from the ground surface into the subsurface injection formation.

32. The method of claim 31, where the method further comprises providing the second well with one or more than one of casing perforations, downhole or surface based water-gas separation systems, and downhole or surface pumps.

33. The method of claim 10 where injecting the gas stream comprises injecting the gas stream from the source of production continually as the gas stream is produced by the source of production.

34. The method of claim 10, where injecting the gas stream comprises injecting the gas stream from the source of production intermittently as the gas stream is produced by the source of production.

* * * * *